United States Patent
Blumenau

[19]

[11] Patent Number: 6,018,779

[45] Date of Patent: Jan. 25, 2000

[54] SYSTEM FOR ENCAPSULATING A PLURALITY OF SELECTED COMMANDS WITHIN A SINGLE COMMAND AND TRANSMITTING THE SINGLE COMMAND TO A REMOTE DEVICE OVER A COMMUNICATION LINK THEREWITH

[75] Inventor: Steven M. Blumenau, Holliston, Mass.

[73] Assignee: EMC Corporation, Hopkinton, Mass.

[21] Appl. No.: 08/990,556

[22] Filed: Dec. 15, 1997

[51] Int. Cl.[7] ........................................ G06F 7/32
[52] U.S. Cl. ................... 710/68; 709/101; 710/6; 710/74; 712/206; 712/215
[58] Field of Search ................. 710/64, 74, 127, 710/129, 6, 68; 707/10, 5; 709/101, 227; 712/215, 206

[56] References Cited

U.S. PATENT DOCUMENTS

| | | | |
|---|---|---|---|
| 5,008,808 | 4/1991 | Fries et al. | 710/6 |
| 5,179,660 | 1/1993 | Devany et al. | 707/10 |
| 5,233,692 | 8/1993 | Gajjar et al. | 710/129 |
| 5,835,856 | 11/1998 | Patel | 455/406 |
| 5,867,660 | 2/1999 | Schmidt et al. | 709/227 |
| 5,870,625 | 2/1999 | Chan et al. | 710/5 |

FOREIGN PATENT DOCUMENTS 404227542A  8/1992  Japan .

*Primary Examiner*—Thomas C. Lee
*Assistant Examiner*—Tammara Peyton
*Attorney, Agent, or Firm*—Fish & Richardson P.C.

[57] ABSTRACT

A method of sending a plurality of commands to a remote device which executes the plurality of commands, the method including the steps of encapsulating the plurality of commands within a single command; and sending the single command to the remote device.

14 Claims, 3 Drawing Sheets

|  | bit 7 | bit 6 | bit 5 | bit 4 | bit 3 | bit 2 | bit 1 | bit 0 |
|---|---|---|---|---|---|---|---|---|
| byte 0 | Operational code (3Ch) ||||||||
| byte 1 | Logical unit number ||| Reserved || Mode |||
| byte 2 | Buffer ID ||||||||
| byte 3 | (MSB) |||||||  |
| byte 4 | Buffer offset ||||||||
| byte 5 |  ||||||| (LSB) |
| byte 6 | (MSB) |||||||  |
| byte 7 | Allocation length ||||||||
| byte 8 |  ||||||| (LSB) |
| byte 9 | Control byte ||||||||

FIG. 2A

|  | bit 7 | bit 6 | bit 5 | bit 4 | bit 3 | bit 2 | bit 1 | bit 0 |
|---|---|---|---|---|---|---|---|---|
| byte 0 | Operational code (3Bh) ||||||||
| byte 1 | Logical unit number ||| Reserved || Mode |||
| byte 2 | Buffer ID ||||||||
| byte 3 | (MSB) |||||||  |
| byte 4 | Buffer offset ||||||||
| byte 5 |  ||||||| (LSB) |
| byte 6 | (MSB) |||||||  |
| byte 7 | Parameter list length ||||||||
| byte 8 |  ||||||| (LSB) |
| byte 9 | Control byte ||||||||

FIG. 2B

SYSTEM FOR ENCAPSULATING A PLURALITY OF SELECTED COMMANDS WITHIN A SINGLE COMMAND AND TRANSMITTING THE SINGLE COMMAND TO A REMOTE DEVICE OVER A COMMUNICATION LINK THEREWITH

BACKGROUND OF THE INVENTION

This application is related to U.S. Ser. No. 08/617,690 entitled "A New Lock-I/O Command," filed Mar. 19, 1996, and incorporated herein by reference.

The invention relates generally to protocols for performing I/O between a host computer and a peripheral, such as a data storage system.

Data storage devices for use with computers have range in complexity from relatively simple, single disk arrangements to very sophisticated, intelligent data storage systems that include arrays of multiple disks and that are capable of storing many tera bytes of data. For any of these storage devices, some protocol must be provided for handling communications and I/O between the host computer and the device.

The storage device manufacturers tend to use an existing, standards-based interface for handling the communications and I/O between the host computer and their devices. One such interface commonly used is the SCSI interface. One main advantage of using such a standards-based interface is that many other vendors and manufacturers also use and support it. Thus, customers to whom a manufacturer wants to sell its storage products are already familiar with the interface and indeed are likely to already be using it. However, whatever benefits are associated with adopting a standard interface often come with a cost that is not simply monetary. More specifically, such standards-based interfaces frequently impose limitations on the overall system performance that can be achieved. That is, they may not be optimized for specific devise architectures or uses.

SUMMARY OF THE INVENTION

In general, in one aspect, the invention is a method of sending a plurality of commands to a remote device which executes the plurality of commands. The method includes the steps of encapsulating the plurality of commands within a single command; and sending the single command to the remote device.

In general, in another aspect, the invention is a method of sending a plurality of commands to a remote device which executes the plurality of commands, wherein the plurality of commands is selected from a set of available commands including a first command. The method includes the steps of encapsulating the plurality of commands within the first command; and sending the first command to the remote device.

In preferred embodiments, the first command is one of a group of commands consisting of a write buffer command, a read buffer command, a send diagnostic command, and a receive diagnostic results command. Also, the step of encapsulating involves overloading the first command.

In general, in still another aspect, the invention is a driver stored in a computer readable medium. The driver is executed by a processor and controls an interface through which data and instructions are sent to a data storage system. The driver includes a first portion of code which causes the processor to collect a plurality of commands; a second portion of code which causes the processor to encapsulate said plurality of commands into a single command; and a third portion of code which sends the single command in which the plurality of commands are encapsulated to the interface for transmission to the data storage system.

In general, in yet another aspect, the invention is a driver including a first portion of code which detects an id in a received command indicating that the received command contains is an overloaded command encapsulating a plurality of commands; and a second portion of code which extracts the plurality of commands from the overloaded command.

The invention relates to a technique for extending the functionality of a set of existing I/O commands by overloading one or more of the commands. Each of the overloaded commands provides the ability to encapsulate other of the commands within that single command and to thereby send multiple commands to a data storage device as part of a single command. In the case of the SCSI protocol, the invention provides a way of significantly increasing the throughput that is achievable with a SCSI interface.

In the case of the SCSI commands, encapsulating I/O commands into a single SCSI command reduces the number of arbitrations that are necessary for sending the set of I/O commands to the peripheral device. Instead of having to perform an arbitration for each of the I/O commands, only a single arbitration need be performed for the single command. An advantage of the invention is that the power of the communication protocol is substantially increased without having to add a new command (i.e., a new opcode) to that protocol.

Other advantages and features will become apparent from the following description of the preferred embodiment and from the claims.

BRIEF DESCRIPTION OF THE DRAWINGS

FIG. 2a is the format the CDB for a READ BUFFER command;

FIG. 2b is the format the CDB for a WRITE BUFFER command;

DESCRIPTION OF THE PREFERRED EMBODIMENTS

Figure 1:
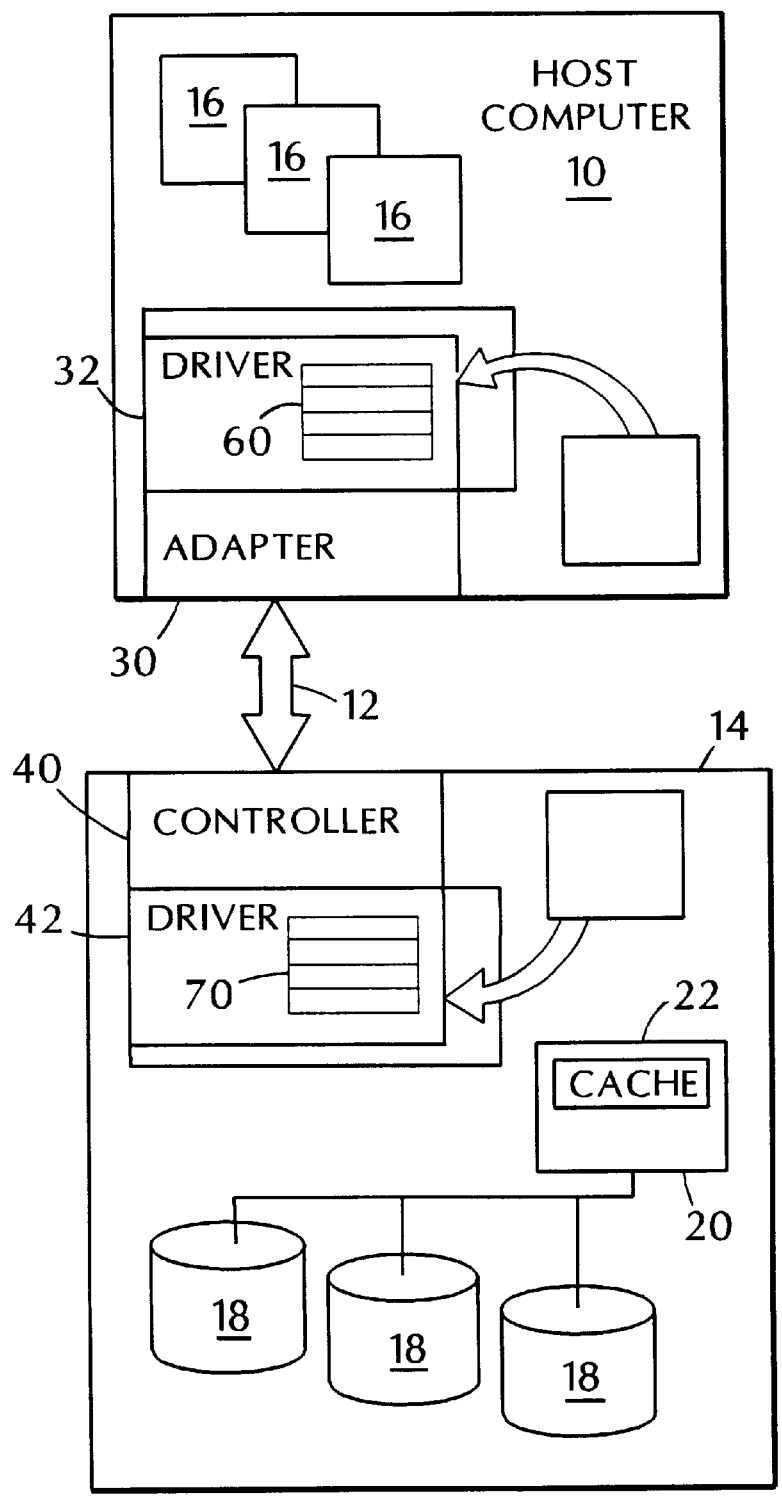
FIG. 1 is a block diagram of a host computer and data storage system which incorporates the invention.

Referring to FIG. 1, a system which incorporates the invention includes a host computer 10 connected through a communications link 12 to a data storage system 14. In the described embodiment, host computer 10 has a UNIX operating system. There are a set of one or more applications 16 running on the host computer, all making I/O requests to the data storage system 14.

Data storage system 14 contains the physical memory in which the data for the applications is stored. In general, data storage system 14 includes multiple arrays of disk devices 18 and a system memory 20. In the described embodiment, system memory 20 is implemented by high-speed random-access semiconductor memory. A portion of system memory implements cache memory 22. The multiple arrays of disk devices 18 provide a permanent data storage area and cache memory 22 provides a fast as well as temporary data storage area. Each disk device within an array of disk devices 18 includes a head-disk assembly, a microprocessor, and a data buffer which enables the data storage system to provide for parallel processing of data.

An example of a group of commercially available products that can be used to implement data storage system 14 is the Symmetrix 5XXX™ series family of products from EMC Corporation of Hopkinton, Mass., which are high performance integrated cache disk arrays designed for online data storage. However, it should be noted that citing this as an example is not meant to be limiting in any way. The ideas described herein can be applied to any data storage system and to peripheral device, in general.

In the described embodiment, the communication link 12 between the host computer 10 and the data storage system 14 is a SCSI bus, which means that all communication over that connection between the two components is handled in accordance with the SCSI protocol. SCSI, which stands for Small Computer System Interface, is a widely used peripheral interface for communicating with peripheral devices, such as disk drives, tape devices, and more sophisticated data storage systems, such as are mentioned herein. The SCSI protocol, which is an ANSI standard, defines a universal parallel, system-level interface for connecting devices along a single cable, referred to as the SCSI bus. The SCSI bus protocol, of which there are currently three versions, namely, SCSI-1, SCSI-2 and SCSI-3, is a device independent I/O bus protocol that supports logical addressing of data. It makes available a number of commands for performing I/O using the connected peripherals and for querying those peripherals regarding certain parameters.

To support the SCSI protocol, the host computer 10 includes a SCSI interface card 30 and a SCSI driver 32 which controls that interface card 30. Similarly, within the data storage system 14 there is another SCSI interface card 40 and another SCSI driver 42 which talks to that interface card 40. On the host side of the connection, the SCSI interface card 30 is also referred to as a host adapter and on the peripheral side of the connection, it is referred to as a controller.

In general, the interface cards represent the electronics that are necessary to communicate with and control the peripheral devices, e.g. the disk arrays within the storage system. The host computer 10 accesses the SCSI bus 12 through the host adapter, which may be implemented as a separate board or may be integrated into the computer motherboard.

The host side software driver 32 allows the operating system and the applications running on the host computer 10 to communicate with the peripheral device or devices that are connected to the SCSI bus 12. The driver communicates with the SCSI interface card 30. The driver will be a multilayered structure. In that case, the lowest layer, which is the adapter specific layer, communicates with the hardware on the SCSI adapter and the additional layers above the lower layer are tailored for the specific device with which the lower layer is communicating. These upper layers might provide additional functionality such as compression, stripping algorithms, etc. In any event, the upper layers communicate through the lowest layer to the interface card and then the device.

The drivers may be supplied on a computer readable medium separate from the rest of the system. The drivers are then loaded into local memory within the host computer or the data storage system and when executed, an image of them are loaded from that local memory into system memory, e.g. RAM. The computer readable medium might be, for example, a computer disk or a remotely located data storage medium that is accessible over the Internet or some other network for downloading to the machine that will execute the program. The drivers can be written in any convenient, available programming language. It is also conceivable that the driver could be implemented on the interface card using a separate processor or other dedicated circuitry.

According to the SCSI protocol, one entity in a communication acts as an initiator and the other entity acts as a target. In this case, the host computer when it initiates an I/O operation directed to the data storage system performs the role of the initiator and the data storage system performs the role of target.

In general, the initiator begins a transaction on the bus by selecting a target. As soon as the target is selected, the target takes control of the bus protocol. Thus, the target decides whether to free the bus and when to reconnect to the initiator if it has freed the bus.

There are eight distinct phases within the SCSI bus protocol. For purposes of the present description, the most relevant phases are the arbitration phase, the selection/reselection phase, the command phase, the data in or data out phase, and the status phase. During the arbitration phase, one or more initiators indicate their wish to use the bus. Through an arbitration process which occurs during the arbitration phase, one of the initiators is selected. Once the initiator has been given ownership of the bus, it enters the selection/reselection phase during which it chooses the target with which to communicate. A reselection phase takes place by a target that has previously released the bus to execute a command and now wishes to re-establish the connection to its initiator.

After the initiator has selected the target, the command phase occurs during which the target receives the actual SCSI command from the initiator. In other words during this phase the initiator transfers to the target the appropriate command opcode identifying the command which is to be executed at the target. Then, during a following data in or data out phase, data is transferred between the target and the initiator, the direction depending upon the command which was executed. Almost all of the command sequences contain a data phase and it provides a way by which control information and user data are exchanged between the target and the initiator. Also, note that "in" and "out" are relative to the initiator. Thus, for example, in the case of a data out phase, data is transferred from the initiator to the target (e.g. as in the case of a write operation) and in the case of a data in phase, data is transferred from the target to the initiator (e.g. as in the case of a read operation).

Finally, during a status phase, the target concludes the SCSI command and informs the initiator of its success or failure. And the bus is freed up for another requester.

For direct access devices such as disk drives, RAM disks, data storage systems, and diskettes, the SCSI standard defines a group of commands for controlling, accessing, and obtaining status on the storage devices. Each command is distinguished from the other commands by an opcode within the appropriate field of the command descriptor block. Among the group of commands, there is a READ command (opcode=28$h$) and a WRITE command (opcode=2A$h$). The READ command requests a specified number of logical blocks from a target and the WRITE command provides the target with a number of logical blocks to be written to the storage medium. The details of the commands and their usage are, of course, well know to persons skilled in the art and thus will not be presented here. For those details, the reader is referred to any one of the many publicly available references on the SCSI protocol.

According to the SCSI standard, each time that an application running on the host computer wants to access the data stored in the data storage system, a separate arbitration phase followed by a command phase is used. Typically, file system applications running on the host computer do many small reads and a few large writes to the data storage system. Thus, separate arbitrations are required for each of the many reads and that seriously degrades the speed and performance of the overall system. Indeed, the greater the number of arbitrations that is required, the slower will be the system. To solve this problem, the described embodiment uses an existing SCSI command to encapsulate a sequence of SCSI commands and sends that sequence all at one time, i.e., during the data phase following an arbitration phase. In other words, an existing SCSI command is overloaded to provide the additional functionality.

A number of different SCSI commands may be overloaded to encapsulate a sequence of SCSI commands. For example, the SCSI standard specifies a group of commands which enable a user to include user-specified (or vendor-specific) features. Examples of such commands include READ BUFFER, WRITE BUFFER, SEND DIAGNOSTIC, and RECEIVE DIAGNOSTIC RESULTS. According to the SCSI standard, the first three of these commands are optional commands, which means that a vendor which implements the standard need not support them. The last command is mandatory.

The described embodiment uses the READ BUFFER command to encapsulate reads and the WRITE BUFFER command to encapsulate writes. In general, the READ BUFFER and the WRITE BUFFER commands are provided in the SCSI protocol to serve a diagnostic function for testing target memory and the SCSI bus integrity. But both commands also allow the user flexibility in defining other functionality for the command.

The command descriptor block (CDB) for the READ BUFFER command is shown in FIG. 2a and the CDB for the WRITE BUFFER command is shown in FIG. 2b. Both of these CDB's are 10 byte blocks which have identical formats, the only difference being that operation code that is entered in the zeroth byte (i.e., byte 0) of the CDB's is different. As indicated in the figures, the opcode for the READ BUFFER command is 3Ch and the opcode for the Write BUFFER command is 3Bh.

In each CDB, the logical unit number identifying the target is stored in the top three bits of byte 1 and the mode is specified in the mode field which occupies the bottom three bits of byte 1. The entry in the mode field identifies the function of the command and the meaning of the fields within the command. Among the modes defined for this command are the following:

| Mode | Description | Type |
| --- | --- | --- |
| 000b | Combined header and data | Optional |
| 001b | Vendor-specific | Vendor specific |
| 010b | Data | Optional |
| 011b | Descriptor | Optional |
| 100b | Reserved | Reserved |
| 101b | Reserved | Reserved |
| 110b | Reserved | Reserved |
| 111b | Reserved | Reserved |

In the described embodiment, specifying 001b in the mode field identifies this command to the driver in the data storage system as a special command. The precise identity of the command is specified in the buffer id field which is byte 2 of the CDB. In other words, this approach allows for the possibility of defining a set of special commands, one of which (i.e., a byte 2 entry of 1) is the special encapsulated SCSI command. If the command is the an encapsulated SCSI command, the remainder of the CDB for the READ BUFFER command (or WRITE BUFFER command) specifies the length of the data that will follow in the subsequent data phase.

During the data phase, the driver sends a sequence of CDB's, each followed by the data that is associated with that CDB. For example, assume that the applications have issued a sequence of write operations directed at the data storage system. In that case, the driver at the host computer takes the group of write operations and sends them as part of a single WRITE BUFFER command which is identified as a special encapsulated SCSI command. The driver also generates an appropriate CDB for each of the write operations. After getting control of the SCSI bus, the driver sends the WRITE BUFFER CDB to the data storage system. That CDB identifies itself as containing encapsulated commands and indicates the amount of data which will then be sent to the data storage system during the subsequent data out phase. During the data out phase, the driver sends the first of the sequence of WRITE command CDB's to the data storage system, followed by a block of data that is to be written to the storage medium in the data storage system. The first CDB indicates the length of data that will follow the WRITE command CDB. After that amount of data is sent, the driver then sends the next WRITE command CDB for the next write operation followed by the data for that write operation. This continues until all of the write operations and the associated data have been sent to the data storage system.

On the data storage system side, the driver detects the id stored in the received WRITE BUFFER command CDB and from that recognizes the command as a special encapsulated command. Thus, the driver interprets the received data during the data out phase as an uninterrupted sequence of CDB's, each followed by the amount of data that is specified in the CDB. The driver extracts the CDB's that are sent during the data out phase and stores them in a local queue for subsequent processing. Since the WRITE BUFFER CDB specified the length of data that was to be sent during the data phase, the driver on the data storage system side knows how much data to expect after each CDB during the data out phase. The driver keeps track of the amount of data that it has received and if, after receiving a complete CDB plus the associated code, that amount is less than the amount specified in the WRITE BUFFER CDB, the driver treats the next portion of the data phase as a new CDB for yet another encapsulated command.

In the case of an encapsulated SCSI command in the form of a READ BUFFER command, the read data is returned to the initiator during a data in phase which occurs after the data storage system has read all of the data specified in the READ BUFFER command. The storage system can remain connected to the host computer until the data is ready, at which time it can then send it to the host computer. Alternatively, the data storage system can perform a disconnect after it receives and acknowledges the READ BUFFER command with the encapsulated I/O commands. In that event, after the data storage system has read the relevant data from the storage medium, it performs a reconnect, reestablishes nexus, and sends the data to the host computer. The disconnect and reconnect capability, of course, is available as part of the current SCSI protocol.

Figure 3:
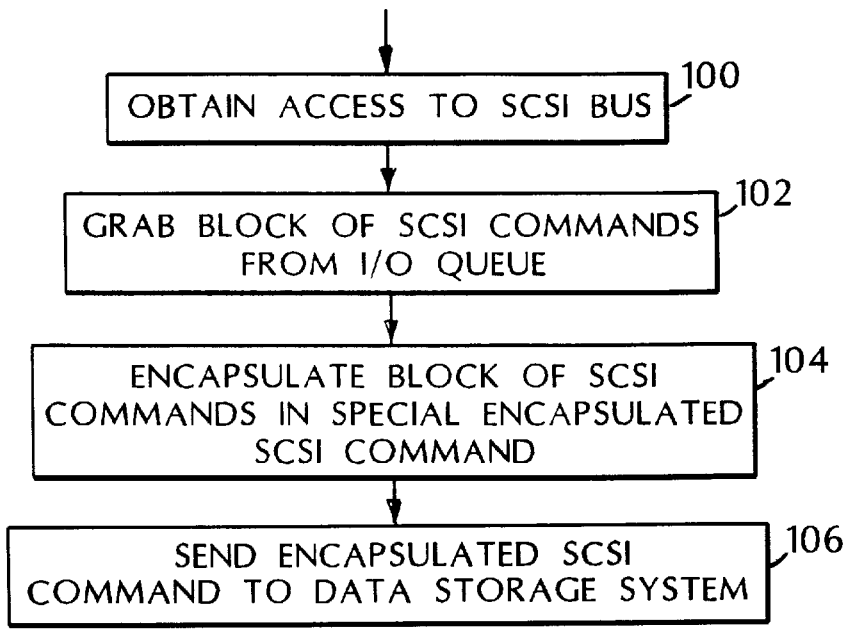
FIG. 3 is a flow chart illustrating the operation of the host side driver.

In the embodiment shown in FIG. 1, the driver on the host side includes a I/O queue 60 or buffer in which it stores the I/O commands sent to it by the applications. Referring now to FIG. 3, whenever the driver obtains access to the SCSI bus (step 100), it grabs the commands that are being held within the I/O queue on the host side (step 102), encapsulates that block of commands within the appropriate encapsulated SCSI command (step 104), and sends that encapsulated SCSI command to the data storage system during the data phase (step 106). While the data storage system is working on processing the embedded commands, the driver places any further I/O commands in the queue for delivery to the data storage system during the next time that it obtains access to the bus to initiate new commands.

According to the just described approach, the driver on the host side sends all of the commands that are in the I/O queue whenever the opportunity arises. Theoretically, that number can be very large and would only require a data phase sufficiently long to accommodate all of the commands that are encapsulated. However, it is possible that the interface through which the I/O is performed may have a limit on the rate of service that it can provide or it may be desirable to put a limit on that service. Thus, it may be appropriate to restrict the number of commands that are embedded in the special encapsulated SCSI command. In that case, the number taken from the queue will be whatever is there up to but not exceeding some user specified limit.

Figure 4:
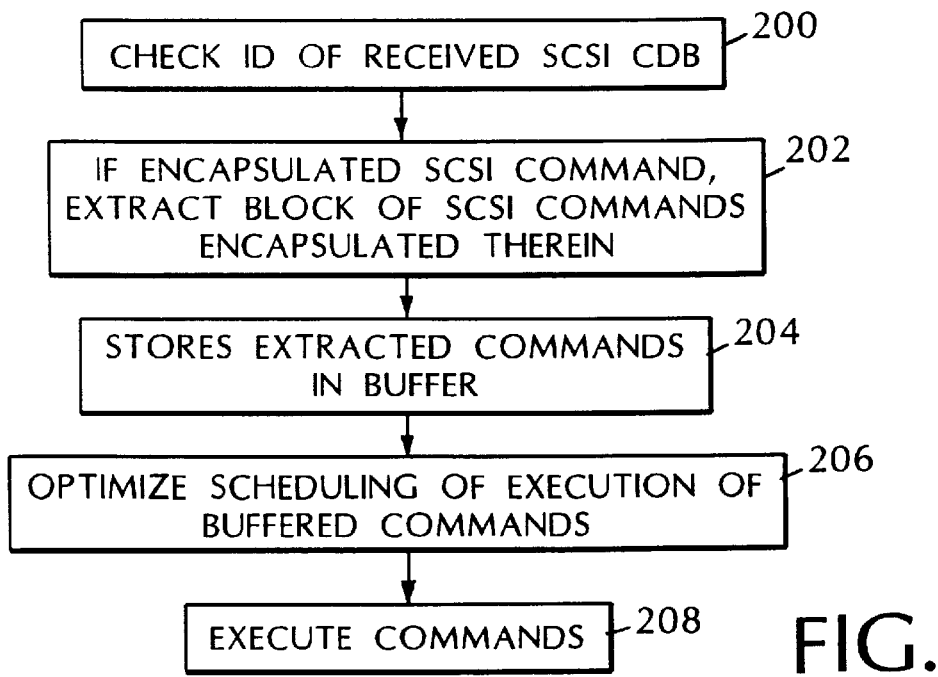
FIG. 4 is a flow chart illustrating the operation of the driver in the data storage system.

Referring again to FIG. 1, the SCSI driver 42 on the data storage side also includes a buffer 70 in which it stores the commands that it receives from the host computer(s) via the special encapsulated SCSI commands. As shown in FIG. 4, the driver in the data storage system checks the id that is sent as part of the CDB (step 200), and when it detects that a special READ BUFFER or WRITE BUFFER command (i.e., an encapsulated SCSI command) has been sent, it extracts the CDB's and associated data from the following data phase (step 202), and stores that information in its buffer (step 204) for subsequent execution within the data storage system (step 208).

Optionally, the driver in the data storage system can also include an algorithm for optimizing the scheduling of the I/O's that are stored in the buffer (step 206). That algorithm would then rearrange the order in which the I/O's are executed so as to improve the performance. For example, if the data storage system is a single disk, then it may be desirable to reorder the I/O's to reduce disk seek times, i.e., reduce the amount by which the read head has to be moved to perform the sequence. Of course, the data storage system of the described embodiment contains arrays of disks on which the data is already distributed across the media to increase performance and improve fault tolerance in which case the algorithm for optimizing scheduling will be much more sophisticated than for the single disk example. Nevertheless, there are many such performance optimization algorithms from which to choose that are known to persons skilled in the art and/or described in the publicly available literature for optimizing the ordering of I/O operations.

Note that existing SCSI drivers can be used to implement the invention described herein. Those drivers already recognize all of the commands that are necessary to implement the encapsulated SCSI feature. Added functionality associated with detecting the special encapsulated SCSI command and processing it appropriately can be layered on top of an existing SCSI driver. Alternatively, a pass-through SCSI interface which avoids the existing SCSI driver is also possible.

An alternative to simply sending a group of I/O commands that has accumulated in the I/O queue on the host side is to send a group of commands that represents an atomic operation. In general, atomicity refers to a higher level operation which results in changing a state that is external to the operation such as a field in a database or a record in a file. The atomic operation is typically made up of a number of lower level operations. Atomicity means that the state is not changed until all of the lower level operations are completed. In other words, an atomic operation implies a set of operations that need to be performed successfully before the higher level operation is considered to be complete.

For example, in a file system, if an application wants to extend a file, at least three different operations must be performed. More specifically, in the case of a single disk storage device, the application needs to perform three different I/O's in three different places on that disk. The application needs to: (1) write to a specific location (e.g. in UNIX, that location is called an inode) indicating that it has just made the file bigger and giving a location of the data; (2) write to the file system control block to indicate that more blocks have been used; and (3) write the data to the new blocks. In conventional systems, individual SCSI commands are used to do each of the three operations listed above. If the host system crashes before the data storage system has completed executing all three commands, the result is a broken file system (i.e., the file system in an inconsistent state). Indeed, a special file system check command (in UNIX it is called FSCK) is provided to enable a user to check for such inconsistencies and repair the file system, if necessary.

Using the ideas described above, the driver on the host side can include all of the commands making up the atomic operation in a single encapsulated SCSI command and send that to the data storage system. Once the data storage system has received the encapsulated SCSI command including all of the individual commands making up the atomic operation, failure of the host system will not affect the completion of the atomic operation in the data storage system. Thus, even if the host computer crashes this will not leave the data storage system in an inconsistent state.

The boundaries of the atomic operation can be communicated to the driver by the application. One way of doing this is to define special atomic operation commands which are used by the application. Associated with each such atomic command is a set of SCSI commands which make up the atomic operation. When the driver receives an atomic command it translates it into the set of SCSI commands and the encapsulates that set of SCSI commands into a special encapsulated SCSI command.

Alternative approaches are, of course, also possible. For example, the driver can include an algorithm which recognizes the sequence of SCSI commands which constitute an atomic operation and send that sequence via the encapsulated SCSI command. That is, the driver would intelligently decide what the encapsulate.

In the described embodiment, when the target sends an acknowledgment to the initiator that acknowledgment indicates the success or failure of the entire sequence of encapsulated SCSI commands. If more detail is desired, the target could also report on the success or failure of each SCSI command through the use of additional commands such as the sense command.

Though the SCSI protocol was used in the embodiments described above, the concepts disclosed herein can be applied to other I/O protocols in which it is possible to encapsulate multiple I/O commands in a single existing command.

The invention is meant to cover all of the above-mentioned alternative approaches as well as others not specifically mentioned. The above-mentioned embodiments and others are within the following claims.

What is claimed is:

1. A method of sending a plurality of commands from a host processor over a communication link to a remote device in accordance with a protocol specifying a set of commands which are available for communicating with the remote device, said plurality of commands being selected from among said set of commands, said method comprising:

on the host processor side of the communication link, encapsulating the plurality of commands within a single command chosen from said set of commands; and sending the single command to the remote device over the communication link.

2. A method of sending a plurality of commands from a host processor to a remote device over a communication link in accordance with an I/O protocol, said I/O protocol specifying a set of available commands which are available for communicating with the remote device, said plurality of commands selected from said set of available commands, said set of available commands also including a first command, said method comprising:

on the host processor side of the communication link, collecting the plurality of commands and encapsulating the collected plurality of commands within the first command; and sending the first command to the remote device over the communication link.

3. The method of claim 2 wherein the first command is one of a group of commands consisting of a write buffer command, a read buffer command, a send diagnostic command, and a receive diagnostic results command.

4. The method of claim 2 wherein the step of encapsulating comprises overloading the first command.

5. A driver stored on a computer readable medium, said driver executed by a processor in a host computer and controlling an interface through which data and instructions are sent to a data storage system over a communication link in accordance with an I/O protocol which specifies a set of available commands which are available for communicating with the data storage system, said driver comprising:

a first portion of code which when executed causes the processor to collect a plurality of commands, said plurality of commands selected from among said set of available commands;

a second portion of code which when executed causes the processor to encapsulate said plurality of commands in a single command, said single command being one of said set of available commands; and a third portion of code which sends the single command in which the plurality of commands is encapsulated to the interface for transmission to the data storage system.

6. The driver of claim 5 wherein said single command is one of a group of commands consisting of a write buffer command, a read buffer command, a send diagnostic command, and a receive diagnostic results command.

7. A driver stored in a computer readable medium, said driver executed by a processor in a data storage system and controlling an interface through which data and instructions are sent to the data storage system over a communication link in accordance with an I/O protocol which specifies a set of available commands which are available for communicating with the data storage system, said driver comprising:

a first portion of code which when executed causes the processor to detect an id in a received command indicating that the received command is an overloaded command encapsulating a plurality of commands, said received command being one of said set of available commands and said plurality of commands being selected from among said set of available commands; and a second portion of code which when executed causes the processor to extract the plurality of commands from the overloaded command for execution by said data storage system.

8. The driver of claim 7 wherein the received command is one of a group of commands consisting of a write buffer command, a read buffer command, a send diagnostic command, and a receive diagnostic results command.

9. The method of claim 2 wherein said remote device is a data storage system and the set of available commands includes read and write commands.

10. The method of claim 9 wherein the communication link is a bus and the sending of the first command is performed over said bus.

11. The method of claim 10 wherein the I/O protocol is a SCSI bus protocol.

12. The method of claim 10 wherein the step of encapsulating comprises setting a flag in the single command identifying the single command as having other commands encapsulated therein.

13. The driver of claim 5 wherein the I/O protocol is a SCSI bus protocol.

14. The driver of claim 5 wherein the second portion of code also causes said processor to set a flag in the single command identifying the single command as having other commands encapsulated therein.

* * * * *